United States Patent [19]

Roberts et al.

[11] 4,166,536

[45] Sep. 4, 1979

[54] CORROSIVE CHEMICAL CONTAINMENT SYSTEM

[75] Inventors: Robert Roberts, Wilmington; Frank M. Chapman, Hockessin, both of Del.

[73] Assignee: The Carborundum Company, Niagara Falls, N.Y.

[21] Appl. No.: 778,205

[22] Filed: Mar. 16, 1977

[51] Int. Cl.$^2$ .................. B23B 15/08; B44D 1/16
[52] U.S. Cl. .................. 206/524.3; 206/524.5; 220/457; 141/1; 427/239; 422/241
[58] Field of Search ............... 220/64, 457; 206/524.3, 206/524.5; 23/252 A; 428/320, 463; 427/239; 141/1, 98

[56] References Cited

U.S. PATENT DOCUMENTS

| 2,426,820 | 9/1947 | Evan | 220/64 |
| 3,279,889 | 10/1966 | Rychly | 23/252 A |
| 3,740,255 | 6/1973 | Fox | 428/463 X |
| 3,824,115 | 7/1974 | Segawa et al. | 427/201 |

FOREIGN PATENT DOCUMENTS 1188556 9/1957 France .................. 427/239

*Primary Examiner*—Sam Silverberg
*Attorney, Agent, or Firm*—David E. Dougherty; Raymond W. Green

[57] ABSTRACT

Corrosive chemicals are contained in metallic vessels, the inside portion of which is coated with a homogeneous, porous polymer containing inorganic filler. The particle size, shape and distribution provides a controlled porosity which allows entrapped permeants from the corrosive chemical to escape, yet does not significantly affect the utility of the protective coating as a chemical corrosion barrier protecting the metallic vessel.

22 Claims, No Drawings

CORROSIVE CHEMICAL CONTAINMENT SYSTEM

BACKGROUND OF THE INVENTION

Corrosive chemicals are kept in large vessels for various reasons, such as storage or for carrying out chemical or physical reactions involving such corrosive chemicals. For large industrial applications, metallic vessels are usually preferred, because of the high strength per given weight and cost of metals as a structural material. Unfortunately, many metals are corroded by many chemicals, requiring a vessel lining to protect the metal vessel from such corrosion. As used herein, the term "vessel" refers to the metallic portion only, i.e., the structural member for containment of the corrosive chemical. The term "container" refers to the vessel and the vessel lining which protects the vessel.

Various polymeric materials, frequently containing fluorine or other halogen, and in particular, polyvinylidene fluoride, have been suggested for use in vessel linings. Vinylidene fluoride polymers are well-known resins, extremely useful in protective coatings for a variety of substrates, including metal, because of the excellent chemical resistance, thermal stability, etc., of the resin. Polymerization techniques used in preparation of vinylidene fluoride polymers are described, for example, in Hauptschein, U.S. Pat. No. 3,193,539. Coatings consisting only of polymers, however, are subject to delamination, cracking, shrinking, blistering, swelling, floating, scaling, and peeling. Accordingly, various proposals have been made in the prior art to supplement the polyvinylidene fluoride or other polymeric material in order to prevent such failure of the coating.

For example, Dukert, et al., U.S. Pat. No. 3,779,854, suggests the use of a polyvinylidene fluoride laminate construction containing, for example, glass cloth, yarn or roving, in order to provide a coating having greater strength and greater impermeability.

Segawa, et al., U.S. Pat. No. 3,824,115, suggests the use of polyvinylidene fluoride compositions containing an inorganic substance having a size of 50–325 mesh (44–297 microns), of a material such as silica, graphite, molybdenum disulfide or chromium oxide, in the undercoat (only) coating to be applied to a metal substrate to be subjected to corrosive chemical. Over the undercoating containing the inorganic substance, Segawa et al require the application of an overcoat, having a thickness of from ¼ to 4 times that of the undercoat, the overcoat containing no such inorganic filler (although depending on the necessity, other substances such as pigments, fillers, and nucleating agents may be added to the Segawa, et al. overcoat). The intent of Segawa, et al., as that of Dukert et al, appears to be the presentation of an impermeable coating, continuous and without gaps or pinholes.

The polyvinylidene fluoride coatings of Dukert et al and Segawa et al, although having certain ability to resist corrosive chemical, are nonetheless subject to delamination, blistering, or other failure, under sufficiently severe conditions. Accordingly, it is an object of the present invention to provide a corrosive chemical containment system with greater resistance to delamination, blistering, and other failure.

SUMMARY OF THE INVENTION

Accordingly, there is provided, according to the present invention, a corrosive chemical containment system, consisting essentially of (a) a metallic, corrosive chemical containment vessel; (b) a homogeneous, porous, chemical corrosion barrier coating upon the inner surface of the vessel exposed to corrosive chemical, consisting essentially of (1) a matrix of chemical corrosion-resistant polymer and (2) from about 20 to about 40 parts by volume, per 100 parts by volume of chemical corrosion-resistant polymer matrix, of an inert filler having a maximum size ranging from about 0.25 to about 200 microns; and (c) a corrosive chemical within the vessel, separated from the metallic vessel by the homogeneous, porous, chemical corrosion barrier coating.

According to another aspect of the invention, there is provided a process of containing a corrosive chemical in a metal vessel and of protecting the metal vessel against the action of corrosive chemical contained within the vessel, consisting essentially of the steps of (a) applying, to the inner surface of a metallic, corrosive chemical containment vessel to be exposed to corrosive chemical, a homogeneous, porous, chemical corrosion barrier coating of the type described above; and introducing a corrosive chemical into the vessel, separated from the metallic vessel by the homogeneous, porous, chemical corrosion barrier coating.

DETAILED DESCRIPTION

Although polyvinylidene fluoride is the preferred chemical corrosion-resistant polymer for use in the present invention, any polymer which is sufficiently resistant to the chemical to be contained can be used. Examples of useful polymers include polytetrafluoroethylene; a copolymer of ethylene and tetrafluoroethylene; a copolymer of ethylene and trichlorofluoroethylene; a copolymer of tetrafluoroethylene and hexafluoropropylene; and a copolymer of tetrafluoroethylene and perfluoroalkyl-perfluorovinyl ether. Although in some coatings of the prior art the inertness of the filler material with respect to the corrosive chemical introduced into the vessel is unimportant, in view of the avowed intention to form an impervious coating, for the purpose of the present invention, in view of the homogeneous porous nature of the chemical corrosion barrier coating, it is necessary that the filler be inert with respect to the corrosive chemical within the vessel. Thus, the identity of the filler will depend upon the corrosive chemical within the vessel, but in general, materials such as glass, silica, carbon, graphite, aluminum silicate and mica are preferred.

The filler may be of various shapes and sizes, the shapes of approximately spherical, fibrous and flake-shaped being preferred. By "approximately spherical", it is meant to describe the ordinary irregularly shaped particles, such as are obtained by grinding or crushing and sieving most materials, i.e., a particle in which the maximum dimension is no more than twice the minimum dimension. When fillers of approximately spherical shape are employed, the maximum size of the filler should range from about 0.5 to about 30 microns. For this shape and size of filler, the particularly preferred materials are glass, silica, carbon and graphite.

Another shape of particle useful as a filler in the present invention is fibrous particles having a diameter of from about 0.5 to about 10 microns and a length of from about 10 to about 20 times their diameter. Materials preferred for this size and shape are glass, carbon, graphite and aluminum silicate.

Another shape of filler preferred for use in the present invention is the flake-shaped particle having a maximum thickness of from about 0.25 to about 5 microns and a maximum surface dimension of from about 4 to about 20 times the maximum thickness of the flake-shaped particles. Materials preferred for flake-shaped particles include glass, mica, carbon and graphite.

By describing the barrier coating as "porous", it is meant that the barrier coating used in the present invention should have a controlled porosity, such that there is produced an interconnecting membrane structure through which the materials entrapped within the coating can permeate, so as to prevent delamination, blistering, rupture or other types of failure, but yet so low that the utility of the barrier is not significantly affected, i.e., so that there are no void spaces large enough that chemicals can pass through the barrier coating uncontrolled. In the case where the filler is electrically non-conductive, the proper degree of porosity can be determined by comparing the ratio of dielectric strengths of the barrier coating when the barrier coating is wet with water and when the barrier coating is dry. For example, a proper coating containing a non-conductive filler and a thickness between about 75 and about 150 microns exhibits a dielectric strength of 10,000 volts across the thickness of the coating when dry, but between 3,000 and 5,000 volts when wet with water. Upon drying the coating again, the 10,000 volts figure is again obtained. It is preferred, in the case of an electrically non-conductive filler, that the ratio of dielectric strengths wet with water to dry range from about 1:4 to about 1:2. Similar porosities are preferred when the filler is conductive, such as when a graphite filler is used, but the dielectric variation method of determining porosity is not useable.

Because of the controlled porosity of the barrier coating of the present invention, chemicals may escape from the barrier without becoming entrapped. It has been found that entrapment of permeating chemicals within a barrier coating, which is extremely difficult to prevent even by using a very impermeable coating, results in blistering and eventual delamination from the structural member. Even though the barrier is permeable, it is effective in protecting the structural member from corrosive chemicals.

The coating composition is homogeneous, and can be applied readily by simple commercially available methods which are in themselves well-known. The composition thickness can be varied to comply with the severity of service.

Generally high percentages of fillers provide the best performance. The limit on such percentage is dependent upon the processability in compounding and application without the loss of continuous polymer phase or matrix. The optimum range for the fillers employed is between about 20 to about 40 parts by volume, per 100 parts by volume of chemical corrosion-resistant polymer matrix used.

The filler component controls the maximum mass concentration of the polymer component in the matrix and the number and surface area contacts of polymer to filler. The smaller the mass concentration and the greater the area of polymer to filler, the higher the rate of permeation will be and the more ideal the transfer throughout the barrier will be.

Effort has been expended in the prior art to develop resistance to permeation in barrier compositions. Permeation does not generally imply chemical reactivity, but is a physical phenomenon based primarily upon the relative molecular size of substances. If molecular openings in a structure are sufficiently large to admit a molecule of a smaller size, penetration may occur. Other forces such as variations in temperature, pressure or surface affinity, etc., can accelerate or influence penetration much as encountered in the flow of fluids through pipes. The thickness of the structure, its length and directness can in turn influence the time necessary for permeation. A finite time is required to pass through the barrier and once it has been penetrated, a finite rate of flow exists, provided environmental conditions are not changed. With variations in temperature, plastic materials in general are subject to changes in volume and consequently changes in density. In turn, the molecular openings are also influenced by temperature. In general, increases in temperature increase the opening size and consequently permeation rates increase. Rates of permeation, however, are extremely low, so that in the coatings of the prior art, quite often a change in temperature or temperature gradient can change the opening size and cause the permeating chemical to become trapped. Further changes in temperature may result in a gaseous permeant condensing and forming a liquid. These entrapped permeants can build up over a period of time and when a temperature rise occurs, cause the entrapped permeant to exert tremendous pressures on the polymer and areas of weak bond strength. Blistering then occurs and eventually delamination is experienced.

The present invention is characterized in that the permeation of the barrier is increased, allowing free access to permeants, yet the rate of permeation and transfer is so low that the utility of the barrier in providing protection to the underlying metallic vessel is not significantly affected.

"Clear coats" of polymer containing no filler, over the filled barrier coating, should be avoided. It has been found, for example, that a coating 2-5 microns thick is sufficient to block permeation enough to cause blistering.

The coatings used in the present invention can be optionally used with a primer as is known in the prior art, such as a polyvinylidenefluoride polymer filled with mica flakes or cobalt oxide. The use of a primer is not essential, however.

What is claimed is:

1. A corrosive chemical containment system, consisting essentially of:
 (a) a metallic, corrosive chemical containment vessel;
 (b) a homogeneous, porous, chemical corrosion barrier coating upon the inner surfaces of the vessel exposed to corrosive chemical, consisting essentially of:
  (1) a matrix of chemical corrosion-resistant polymer, and
  (2) from about 20 to about 40 parts by volume, per 100 parts by volume of chemical corrosion-resistant polymer matrix, of an inert filler having a maximum size ranging from about 0.25 to about 200 microns; and
 (c) a corrosive chemical within the vessel, separated from the metallic vessel by the homogeneous, porous, chemical corrosion barrier coating.

2. A corrosive chemical containment system according to claim 1, wherein the chemical corrosion-resistant polymer is selected from the group consisting of polyvinylidene fluoride; polytetrafluoroethylene; a copolymer of ethylene and tetrafluoroethylene; a copolymer of ethylene and chlorotrifluoroethylene; a copolymer of polytetrafluoroethylene and hexafluoropropylene; and a copolymer of polytetrafluoroethylene and perfluoroalkylperfluorovinyl ether.

3. A corrosive chemical containment system according to claim 1, wherein the chemical corrosion-resistant polymer is polyvinylidene fluoride.

4. A corrosive chemical containment system according to claim 2, wherein the filler is selected from the group consisting of glass, silica, carbon, graphite, aluminum silicate and mica.

5. A corrosive chemical containment system according to claim 4, wherein the filler is of approximately spherical shape and has a maximum size of from about 0.5 to about 30 microns.

6. A corrosive chemical containment system according to claim 5, wherein the filler is selected from the group consisting of glass, silica, carbon and graphite.

7. A corrosive chemical containment system according to claim 4, wherein the filler is fibrous particles having a diameter of from about 0.5 to about 10 microns and a length of from about 10 to about 20 times their diameter.

8. A corrosive chemical containment system according to claim 7, wherein the filler is selected from the group consisting of glass, carbon, graphite and aluminum silicate.

9. A corrosive chemical containment system according to claim 4, wherein the filler is flake-shaped particles having a maximum thickness of from about 0.25 to about 5 microns and a maximum surface dimension of from about 4 to about 20 times their maximum thickness.

10. A corrosive chemical containment system according to claim 9, wherein the filler is selected from the group consisting of glass, mica, carbon and graphite.

11. A corrosive chemical containment system according to claim 1, wherein the filler is electrically non-conductive, and wherein the barrier coating has a ratio of dielectric strengths wet with water to dry ranging from about 1:4 to about 1:2.

12. A process of containing a corrosive chemical in a metal vessel of protecting the metal vessel against action of corrosive chemical contained within the vessel, consisting essentially of the steps of:
(a) applying, to the inner surfaces of a metallic, corrosive chemical containment vessel to be exposed to corrosive chemical, a homogeneous, porous, chemical corrosion barrier coating, consisting essentially of:
(1) a matrix of chemical corrosion-resistant polymer, and
(2) from about 20 to about 40 parts by volume, per 100 parts by volume of chemical corrosion-resistant polymer matrix, of an inert filler having a maximum size ranging from about 0.25 to about 200 microns; and
(b) introducing a corrosive chemical into the vessel, separated from the metallic vessel by the homogeneous, porous, chemical corrosion barrier coating.

13. A process according to claim 12, wherein the chemical corrosion-resistant polymer is selected from the group consisting of polyvinylidene fluoride; polytetrafluoroethylene; a copolymer of ethylene and tetrafluoroethylene; a copolymer of ethylene and chlorotrifluoroethylene; a copolymer of polytetrafluoroethylene and hexafluoropropylene; and a copolymer of polytetrafluoroethylene and perfluoroalkyl-perfluorovinyl ether.

14. A process according to claim 12, wherein the chemical corrosion-resistant polymer is polyvinylidene fluoride.

15. A process according to claim 13, wherein the filler is selected from the group consisting of glass, silica, carbon, graphite, aluminum silicate and mica.

16. A process according to claim 15, wherein the filler is of approximately spherical shape and has a maximum size of from about 0.5 to about 10 microns.

17. A process according to claim 16, wherein the filler is selected from the group consisting of glass, silica, carbon and graphite.

18. A process according to claim 15, wherein the filler is fibrous particles having a diameter of from about 0.5 to about 30 microns and a length of from about 10 to about 20 times their diameter.

19. A process according to claim 18, wherein the filler is selected from the group consisting of glass, carbon, graphite and aluminum silicate.

20. A process according to claim 15, wherein the filler is flake-shaped particles having a maximum thickness of from about 0.25 to about 5 microns and a maximum surface dimension of from about 4 to about 20 times their maximum thickness.

21. A process according to claim 20, wherein the filler is selected from the group consisting of glass, mica, carbon and graphite.

22. A process according to claim 12, wherein the filler is electrically non-conductive, and wherein the barrier coating has a ratio of dielectric strengths wet with water to dry ranging from about 1:4 to about 1:2.

* * * * *